(12) United States Patent  
Conahan

(10) Patent No.: US 8,812,719 B2  
(45) Date of Patent: Aug. 19, 2014

(54) DISTRIBUTED DELIVERY OF NOTIFICATIONS IN A MASS NOTIFICATION SYSTEM

(75) Inventor: Natasha Conahan, San Diego, CA (US)

(73) Assignee: Blackboard Connect Inc., Washington, DC (US)

( * ) Notice: Subject to any disclaimer, the term of this patent is extended or adjusted under 35 U.S.C. 154(b) by 453 days.

(21) Appl. No.: 12/475,386

(22) Filed: May 29, 2009

(65) Prior Publication Data

US 2010/0306322 A1 Dec. 2, 2010

(51) Int. Cl.
- *G06F 15/16* (2006.01)
- *H04L 12/18* (2006.01)
- *H04L 29/08* (2006.01)

(52) U.S. Cl.
CPC ........... *H04L 12/1895* (2013.01); *H04L 67/322* (2013.01); *H04L 67/32* (2013.01)
USPC ............ 709/232; 709/206; 709/207; 709/224

(58) Field of Classification Search
CPC .... H04L 67/322; H04L 67/32; H04L 12/1895
See application file for complete search history.

(56) References Cited

U.S. PATENT DOCUMENTS

| 6,006,248 | A | * | 12/1999 | Nagae | 709/202 |
| 6,363,411 | B1 | | 3/2002 | Dugan et al. | |
| 2006/0095529 | A1 | | 5/2006 | McNamara et al. | |
| 2008/0002676 | A1 | | 1/2008 | Wiley et al. | |
| 2008/0059998 | A1 | * | 3/2008 | McClenny et al. | 725/33 |
| 2008/0263169 | A1 | | 10/2008 | Brabec et al. | |
| 2010/0027769 | A1 | * | 2/2010 | Stevens et al. | 726/26 |

* cited by examiner

*Primary Examiner* — Thu Nguyen
*Assistant Examiner* — Nam Tran
(74) *Attorney, Agent, or Firm* — McDermott Will & Emery LLP

(57) ABSTRACT

A method for distributing notifications to a plurality of recipients is disclosed. The method includes receiving at least one notification for distribution to the recipients, and identifying a distributor configured to transmit the notification to the recipients. The method also includes determining a notification distribution capacity of the distributor, and transmitting the notification to the distributor based on the notification distribution capacity of the distributor. A system for distributing notifications to a plurality of recipients is also provided.

13 Claims, 4 Drawing Sheets

DISTRIBUTED DELIVERY OF NOTIFICATIONS IN A MASS NOTIFICATION SYSTEM

BACKGROUND

1. Field

The present disclosure relates to transmission of notifications, and more particularly, to methods and systems for distributing notifications in a notification system.

2. Background

Businesses and governmental entities, including federal and state officials, their agencies, municipalities and schools, are ever more reliant on communicating through the mass transmission of notifications to their staff, citizens and family members of students to keep these constituencies apprised of important events, and sometimes of emergencies. For example, a school principal might need to send a message to the parent of every child that the school will be closed the next day due to some unforeseen event such as flooding, fire, or freezing conditions. Notifications with such messages might be sent by telephones, facsimiles, pagers, electronic mail (email), and/or text messages. These notifications will typically vary in their degree of importance, in the number of recipients, or in the immediacy with which they must be sent.

However, there currently exists a growing problem as mass notification transmission systems become more prevalent. In particular, a group of notifications (e.g., notifications that are transmitted together from a mass notification provider 68) is provided to distributors without regard to the potential capacity of these distributors (e.g., telecommunication providers) responsible for delivering the notifications. Consequently, the notifications may be sent to a distributor with limited distribution capacity, potentially overloading the distribution network of the distributor, which may in turn result in a delay or failure in the delivery of the notifications, including for attempts by a distributor to re-deliver the notifications.

In such situations, because the distributor is incapable of handling delivery of the group of notifications, delivery of the notifications may be unsuccessful, especially when the distributor's network is experiencing a significant traffic burden. It would be desirable to distribute groups of notifications according to the anticipated available capacity of the distributors in order to avoid delays, failures, and attempted re-delivery of notifications.

SUMMARY

There is a need for a mass notification system that distributes notifications according to the anticipated available capacity of the distributors responsible for delivering the notifications. Embodiments of the disclosed systems and methods address this and other needs.

The present disclosure describes systems and methods whereby mass notifications can be distributed according to the anticipated capacity of a distributor, so that the success rate of the delivery of the notifications is increased and overall network congestion is better managed.

In certain aspects of the disclosure, a method for distributing notifications to a plurality of recipients is provided. The method includes receiving at least one notification for distribution to the recipients, and identifying a distributor configured to transmit the notification to the recipients. The method also includes determining a notification distribution capacity of the distributor, and transmitting the notification to the distributor based on the notification distribution capacity of the distributor.

In a further aspect of the disclosure, a system for distributing notifications to a plurality of recipients is provided. The system includes an identification module configured to identify a first distributor configured to transmit at least one notification to a plurality of recipients, and a calculation module configured to determine a notification distribution capacity of the first distributor. The system also includes a transmission module configured to transmit the notification to the first distributor based on the notification distribution capacity of the first distributor.

In yet a further aspect of the disclosure, a machine-readable medium encoded with instructions for distributing notifications to a plurality of recipients is provided. The instructions include code for receiving at least one notification for distribution to the recipients, and identifying a distributor configured to transmit the notification to the recipients. The instructions also include code for determining a notification distribution capacity of the distributor, and transmitting the notification to the distributor based on the notification distribution capacity of the first distributor.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
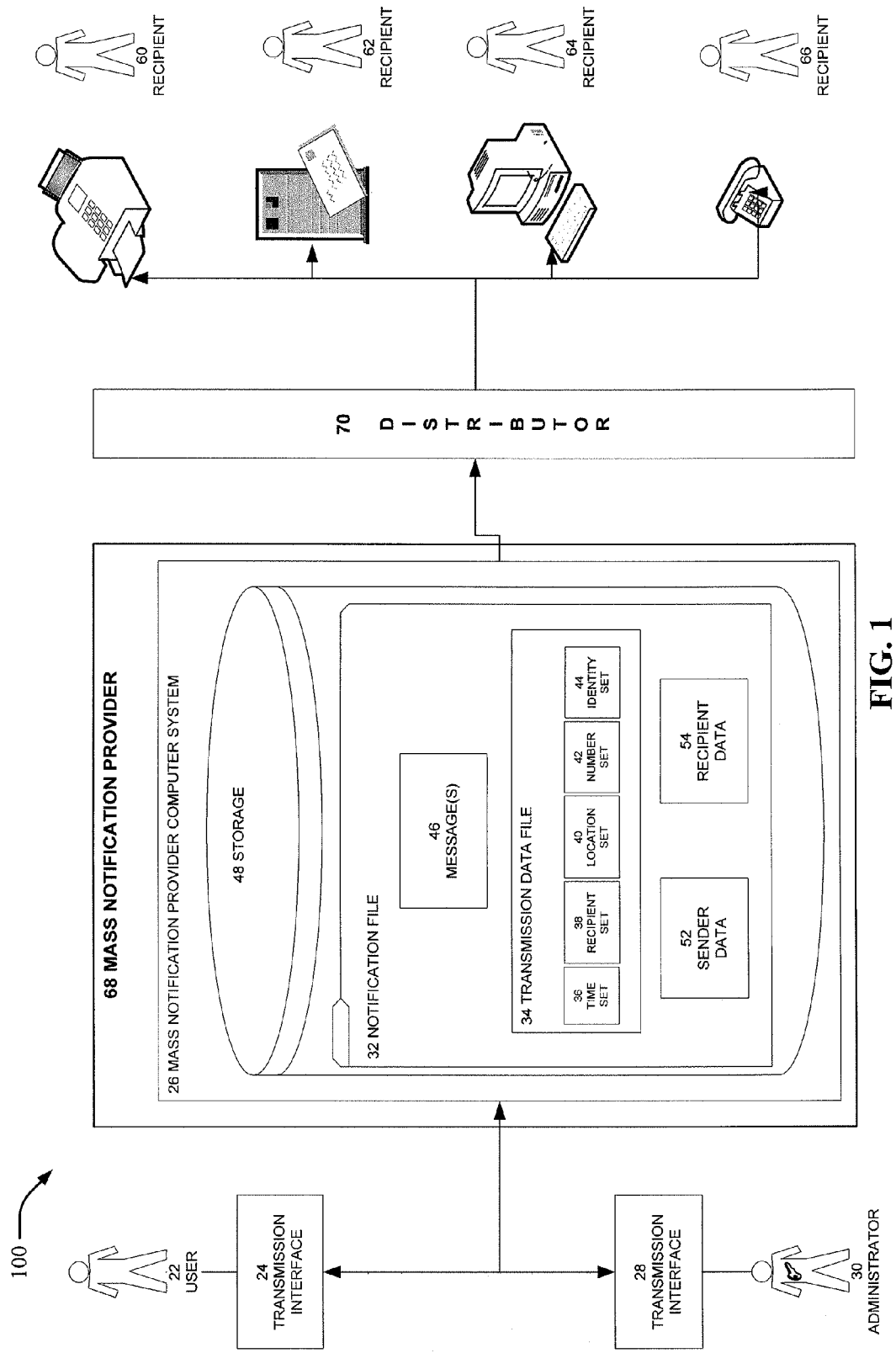
FIG. 1 is a diagram illustrating an example of a mass notification transmission system.

There is a problem in mass notification systems that distributors, unable to identify the type and relevance of a particular call or group of calls associated with a notification event, may not adequately be able to manage traffic traversing their respective network(s) in a manner that best serves the interest of public safety. This and other problems are addressed and solved, at least in part, by embodiments of the present disclosure which include a system for distributing notifications to a plurality of recipients. The system includes an identification module configured to identify a first distributor configured to transmit at least one notification to a plurality of recipients, and a calculation module configured to determine a notification distribution capacity of the first distributor. The system also includes a transmission module configured to transmit the notification to the first distributor based on the notification distribution capacity of the first distributor.

With reference to the drawings, which are provided by way of exemplification and not limitation, there are disclosed embodiments for distributing a mass of outgoing digital notifications to a selected group, or groups, of recipients by way of various communication methods. More specifically, distribution of mass notifications according to the capacity of distributors is disclosed. As discussed and used interchangeably herein, a distributor as discussed herein is any entity responsible for the distribution and/or delivery of a notification, such as, without limitation, a telecommunication provider, Internet services provider, or transmitting station. A capacity of a distributor as discussed herein includes the capability of an entity responsible for delivering a notification to an intended recipient of the notification to successfully deliver the notification to the intended recipient. For example, a distributor A has less capacity than a distributor B when distributor B has more network lines, more devices, and more excess capacity than distributor A to successfully deliver a notification. A mass notification provider as discussed herein includes, for example, mass messaging and notification providers, telemarketers, and campaign callers.

By way of short summary, a telephone notification (e.g., a telephone call) can be routed based on the "NPA-NXX" number of the intended recipient (e.g., the dialed party's telephone number). A Numbering Plan Area (NPA) code/number is the initial group of three digits of a North American Numbering Plan (NANP) code/number. The format of an NPA number is NXX, where N is any digit from 2 to 9 and X is any digit from 0 to 9. For example, the NPA-NXX of the telephone number (222) 555-1212 is 222-555. The NPA-NXX number can identify the central office (e.g., distributor's office or central office) or distribution device (e.g., digital switch) serving a recipient. Line numbers under a particular NPA-NXX are served from the same central office and are generally in the same local area. The Telcordia Local Exchange Routing Guide (LERG) identifies the default distributor (e.g., telecommunication provider) and central office associated with a particular NPA-NXX.

FIG. 1 is a diagram illustrating an example of a mass notification transmission system. In the following description of FIG. 1, only one distributor is described in order to simplify the explanation of how notifications are distributed to the distributor. However, the present disclosure is equally applicable to a plurality of distributors.

As can be seen in FIG. 1, a central processing unit (CPU) or computer system 26 forms a core component of the system. The computer system 26 is preconfigured to receive a request for a notification 32 from a user (or "initiator") 22 who may wish to initiate the sending of a notification 32 that corresponds to the request to a large number of recipients 60, 62, 64, and 66. In certain embodiments, the computer system 26 (hereinafter "mass notification provider computer system 26") is provided by the entity (e.g., mass notification provider 68) responsible for generating and providing notifications in response to the request for the notification from the user 22. In such embodiments, the user can initiate messages via a telephonic system and/or log into the mass notification provider computer system 26, such as over a network, e.g., the Internet. The user 22 will have normally acquired the right to send a notification 32 into the mass notification provider computer system 26 by earlier entering into a contract with the mass notification provider 68, entering his name on a list of legitimate users, paying the required fee if appropriate, receiving the proper training and/or certification, and acquiring an entry code. The notification 32 the user 22 sends to the mass notification provider computer system 26 may be sent in any one of a number of different formats via a transmission interface 24. It should be noted that a system administrator 30 (e.g., a user having greater access rights than user 22) may also send a notification 32 via a different transmission interface 28. For example, the transmission interface 24 and/or 28 may be an ordinary land telephone, a radio transmitter, a cell phone, a computer for sending email, a computer with an internet connection, or it may be a facsimile machine for sending faxes, or the like. In certain embodiments, an administrator 30 may be required to affix a special code to authenticate a notification 32.

Once the notification 32 is received by the mass notification provider computer system 26 from the user 22, it may be stored by the mass notification provider computer system 26 as a file in a local or remote memory associated with the mass notification provider computer system 26. The notification 32 may be associated with at least one user message 46 and a transmission data file 34 for later use. A notification 32 can include one or multiple messages 46 selected and/or created by the user 22. A message 46 included in a notification 32 might be, "Please avoid Main Street due to damage caused by recent severe weather."

If the notification 32 received is an ordinary voice notification 32 via an interface 24 which is a telephone, the analogue voice signal may be converted to a digital sound file such as a .wav file and stored by the mass notification provider computer system 26 as such. If the notification 32 received via the interface 24 is an email or a text message, it may be stored by the mass notification provider computer system 26 as a .txt file, but it may also be converted to a sound file using text-to-speech (TTS) software. If the notification 32 is received as a facsimile, it may be stored by the mass notification provider computer system 26 as a .pdf file. Such file formats are exemplary only. The notification 32 may also be converted using a telecommunications device for the deaf (TDD) or teletypewriter (TTY) device. All of these notifications 32 are stored pending distribution to the appropriate recipients in the appropriate form.

Once the notification 32 is stored by the mass notification provider computer system 26, it is associated with the transmission data file 34 that is structured to include one or more of a number of data sets 36-44 that will later assist in controlling the transmission of the notification 32. For example, the user 22 may insert information into the data sets 36-44 by entering keystrokes (telephone key, computer key, etc.) in response to queries from the mass notification provider computer system 26 as to what information should be entered in the data sets 36-44. The data sets 36-44 will then be associated with the notification 32, as described.

The data sets 36-44 may comprise the following data sets. A time set 36 contains information relating to the time the notification 32 is scheduled for distribution. A recipient set 38 contains information relating to the class of recipients the notification 32 is intended to reach. For example, the recipients may be all the parents of students at a school between 6th and 8th grades. A location set 40 contains information relating to the geographical locations the notification 32 is intended to reach. For example, the intended recipients may be all the residents in a town living on one side of a river, or next to a combustible forest. Further data sets may be generated from information provided in preceding sets. For example, a number set 42 may be generated by the mass notification provider computer system 26 from the information entered into the recipient set 38, wherein the mass notification provider computer system 26 calculates the number of intended recipients of the notification 32, and enters that number into the number set 42 for later use. A sender identity set 44 may contain identification information for the identity of the user 22 who created the notification 32, and information relating to the status and rights of that user 22.

As noted above, the notification 32 may be created in a plurality of formats (e.g., .wav, .txt, or .pdf). For example, the notification 32 may be created in at least one format, based on whether the notification 32 is received via interface 24 as a voice notification 32, a text message, an email, or a facsimile. Once the notification 32 is created in the appropriate plurality of formats (e.g., .wav, .txt, or .pdf) and is associated with the transmission data file 34 with its data sets, the mass notification provider computer system 26 stores the notification 32 and associated transmission data file 34 in an interface suitable for storage 48 until a triggering event occurs.

According to an embodiment of the disclosure, the notification 32 stored in storage unit 48 may further include sender data 52 and recipient data 54. To obtain information that may be needed by transmission data file 34, appropriate data may be accessed from storage unit 48. For example, in the context of school, storage unit 48 may be configured to include at least the following fields for each student: "Parent Name," "Student Name," "User 1," and "Message 1." As another example, if recipient set 38 identifies the recipients as all parents of students at a school between 6th and 8th grades, the parent contact information for all 6th through 8th grade students can be accessed from storage unit 48. It should be noted that the storing of notification file 32, which includes messages 46, transmission data file 34, sender data 52, and recipient data 54 is not limited to storage unit 48, and that this data may be stored elsewhere in mass notification provider computer system 26 or in other external systems.

Within the notification 32 in the mass notification provider computer system 26, each recipient of the notification 32 has already been associated with a form of transmission. This may be according to a prior request made by each potential recipient to the management of the system, or to a default form of transmission. In certain embodiments, this recipient association is stored in recipient data 54. Thus, for example, recipient 60 may have requested to be associated with a form of transmission by facsimile, recipient 62 may be associated with a form of transmission by voicemail, recipient 64 may be associated with a form of transmission by email, recipient 66 may be associated with a means of transmission by telephone, text message, or pager, and so on. Thus, the mass notification provider computer system 26 is configured to transmit the notification 32 in appropriate format (e.g. .wav, .txt, .pdf) to each recipient, according to a known method. In certain embodiments, a means of transmission may be associated with the recipient based on a selection made by the user 22. For example, a user 22 may choose to associate a recipient with voicemail if the notification 32 is urgent. In certain embodiments, a means of transmission may be automatically associated with the recipient based on the content of the notification 32. For example, if the notification 32 includes an image, then means of transmission may be facsimile, MMS (multimedia message service), or email.

When a triggering event occurs, the mass notification provider computer system 26 causes one or many notifications 32 (having been delivered to the mass notification provider computer system 26 by an enabled user 22 possessing an appropriate access code) to be distributed, according to known methods, to a mass of recipients, e.g. recipients 60-66 of FIG. 1, identified by the user 22. In such instances, the notifications 32 may be provided by mass notification provider 68 to a distributor 70, such as a telecommunications company, responsible for the delivery of the notifications 32 to the intended recipients 60, 62, 64, and 66. Such notifications 32 may be combined with numerous similar notifications 32 (e.g., in a notification 32 batch) for mass transmission at approximately the same time. This capability of the system 100 places power in the hands of an approved official, institution or group of people to keep classes of citizens informed of events that are directly relevant to them on a near real time basis.

Considering further aspects of the disclosed systems and methods, an exemplary problem that may be encountered will now be described. A group of telephone notifications 32 notifying all of a city's residents of an important event may all be received by a distributor 70 at approximately the same time, causing the capacity for the distribution devices (e.g., switches) at the distributor 70 to be overloaded. Since the capacity of the devices has been reached or possibly even exceeded, delivery of the telephone notifications 32 may be delayed, blocked, or even fail. The city residents may then remain uninformed of the event. This is an undesirable situation, especially if the notification 32 is regarding an event of particular significance to public safety of the citizens, such as a warning regarding a nearby public hazard. In a mass notification transmission system 100 such as the one illustrated in FIG. 1, a group of notifications 32 can be distributed based on the capacity of the distributor 70.

Returning to the previous example, according to the present disclosure, distribution devices at the distributor would each receive a specific subset of the telephone notifications 32, with each specific subset of notifications 32 specifically containing notifications 32 for intended recipients with whom the corresponding distribution device has previously been associated. The distributor 70 would further receive the subsets of the group of notifications 32 at the distribution devices according to the patterns of available capacity of those distribution devices, thereby avoiding an overload in capacity. For example, if distributor 70 had one distribution device with a pattern of available capacity to deliver a 30 second message with a 10 second hold time, at a rate of 100 notifications per minute, notifications to recipients living in a certain geographical region, then, according to the present disclosure, the distribution device would only receive notifications for recipients living in the certain geographical region at no more than 100 notifications per minute. Thus, an efficient method and system for distributing notifications 32 from a mass notification provider computer system 26 is provided.

Figure 2:
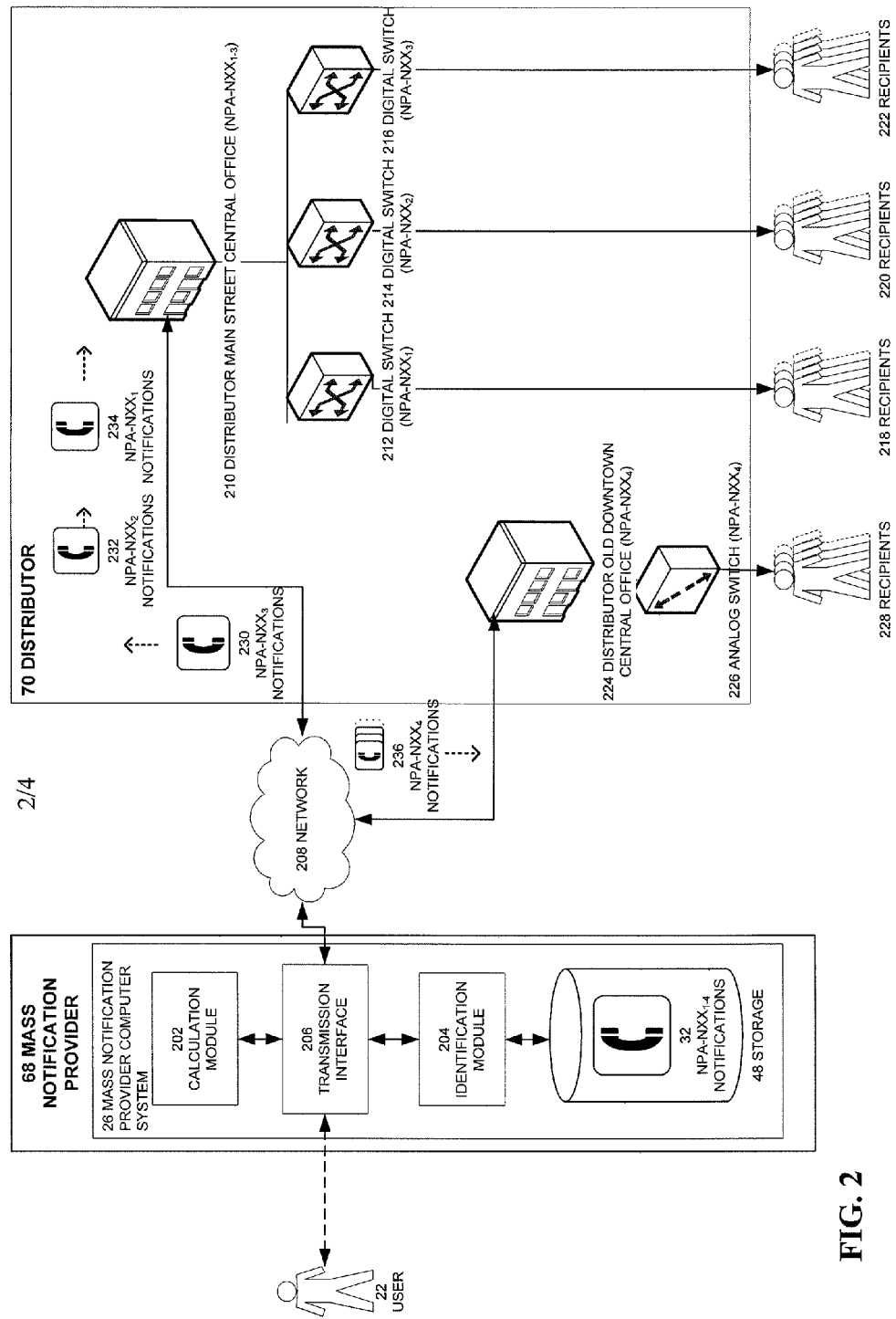
FIG. 2 is a diagram illustrating an embodiment of the mass notification provider computer system of FIG. 1 configured for distributing notifications based on the anticipated available capacity of a distributor.

FIG. 2 is a diagram illustrating an embodiment of the mass notification provider computer system 26 of FIG. 1 configured for the distribution of notifications based on the capacity of a distributor 70.

As can be seen in FIG. 2, mass notification provider computer system 26 includes a transmission interface 206, an identification module 204, a calculation module 202, and storage 48. The mass notification provider computer system 26 is coupled to a network 208 for delivery of notifications to intended recipients.

The transmission interface 206 is similar to the transmission interface 24, and may be, for example, an ordinary land telephone, a radio transmitter, a cell phone, a computer for sending email, a computer with an internet connection, a modem, a data communications device, or it may be a facsimile machine for sending faxes, or the like. The transmission interface 206 is configured to transmit a notification 32 to a distributor 70 based on the notification distribution capacity of the distributor 70 (e.g., the capability of distributor 70 to deliver the notification 32 successfully to the intended recipient). For example, the transmission interface 206 can transmit, via network 208, groups of notifications 230, 232, and 234 to recipients 218, 220, and 222 via the distribution devices 212, 214, and 216 for the distributor's Main Street Central Office 210, and transmit another group of notifications 236 to recipients 228 via the distribution device 226 located at the distributor's Old Downtown Central Office 224. In certain embodiments, the transmission interface 206 includes transmission rate information, understandable by the distributor 70, with the transmission of the notifications 32. For example, the transmission interface 206 may include an indication to the distributor 70 to distribute the notifications 32 at a specific distribution device at a rate of 100 notifications per second.

The identification module 204 is configured to identify the distributor(s) 70 configured to transmit a notification 32 to intended recipients. For example, the identification module 204 can identify the distributor 70 with reference to routing data (e.g., a telecommunication routing guide), such as the LERG, as discussed above. In certain embodiments, the identification module 204 is configured to identify all distributor(s) configured to transmit a notification 32 to intended recipients. In certain embodiments, the identification module 204 accesses this information via the network 208, such as obtaining the information from the Internet. Specifically, and by way of example only, the identification module 204 is configured to determine that the intended recipients 218, 220, 222, and 228 of the group of notifications 32 are associated with the numbers for $NPA-NXX_1$, $NPA-NXX_2$, $NPA-NXX_3$, and $NPA-NXX_4$. The identification module 204 can then look up the numbers for $NPA-NXX_1$, $NPA-NXX_2$, $NPA-NXX_3$, and $NPA-NXX_4$ in the LERG to determine the distributor 70 responsible for delivering voice notifications and other telecommunications to those numbers, thereby identifying the distributor(s). In certain embodiments, more than one distributor may be responsible for delivering a group of notifications. For example, from a group of 1000 notifications, 750 notifications may be distributed by a first distributor to a first group of recipients, and 250 notifications may be distributed by a second distributor to a second group of recipients.

The calculation module 202 is configured to determine a notification distribution capacity of the distributor 70. For example, using the LERG, the calculation module 202 can determine the distributor's offices, distribution devices, and, either alone or combined with intelligence acquired by other means and methodologies, the capacity of those distribution devices for delivering notifications to the intended recipients. Specifically, and by way of example only, the calculation module 202 determines the numbers for $NPA-NXX_1$, $NPA-NXX_2$, and $NPA-NXX_3$ are serviced through the distributor's Main Street Central Office 210, and the numbers for $NPA-NXX_4$ are serviced through the distributor's Old Downtown Central Office 224. The calculation module 202 also determines that the distribution device responsible for servicing the numbers for $NPA-NXX_1$ is a digital switch 212 located at the distributor's Main Street Central Office 210. Similarly, the calculation module 202 determines that the distribution devices responsible for servicing the numbers for $NPA-NXX_2$ and $NPA-NXX_3$ are also digital switches 214 and 216 located at the distributor's Main Street Central Office 210, and the distribution device responsible for servicing the numbers for $NPA-NXX_3$ is an analog switch 226 located at the distributor's Old Downtown Central Office 224. Based on the type of distribution device identified, and optionally using intelligence acquired by other means and methodologies, the calculation module 202 can approximate the capacity and subsequent delivery algorithm appropriate for notifications sent to the distribution device. By way of example only, the calculation module 202 may determine that the analog switch 226 servicing recipients 228 at the distributor's Old Downtown Central Office 224 is only capable of delivering three notifications per second, while each of the digital switches 212, 214, and 216 servicing recipients 218, 220, and 222 at the distributor's Main Street Central Office 210 are capable of delivering one hundred notifications per second. The calculation module 202 is further configured to determine if multiple distribution devices are associated with a given office or an NPA-NXX code when determining a notification distribution capacity.

Using the information obtained regarding the capacity of the distribution devices 212, 214, 216, and 226 at the distributor's Main Street Central Office 210 and Old Downtown Central Office 224 locations, the calculation module 202 can determine a notification distribution capacity of the distributor 70 (i.e., the ability of the distributor 70 to distribute the notifications 32 with the distribution devices 212, 214, 216, and 226) in order to distribute the notifications 32 for $NPA-NXX_1$, $NPA-NXX_2$, $NPA-NXX_3$, and $NPA-NXX_4$ according to the system disclosed herein. For example, the calculation module 202 can divide and distribute, via transmission interface 206, the single group of notifications 32 for $NPA-NXX_1$, $NPA-NXX_2$, $NPA-NXX_3$, and $NPA-NXX_4$ into four separate groups of notifications according to the intended recipients' associated NPA-NXX number and distribution device capacity: (1) a large group of notifications 234 for intended recipients 218 serviced by the high capacity digital switch 212 for $NPA-NXX_1$, (2) a large group of notifications 232 for intended recipients 220 serviced by the high capacity digital switch 214 for $NPA-NXX_2$, (3) a large group of notifications 230 for intended recipients 222 serviced by the high capacity digital switch 216 for $NPA-NXX_3$, and (4) multiple smaller groups of notifications 236 for intended recipients 228 serviced by the low capacity analog switch 226 for $NPA-NXX_4$. In certain embodiments, the calculation module 202 can divide and distribute, via transmission interface 206, the group of notifications 32 according to other grouping methods.

The calculation module 202 can also take into account other factors in determining a notification distribution capacity, such as, but not limited to, routing data, a routing path for the distribution, the time at which the notifications are intended to be distributed, the date the notifications are intended to be distributed (for instance, whether it is Mother's Day), the size of the notifications, the notifications' priority, direct input from the distributor 70, switch availability (e.g., due to maintenance and upgrades), and a past history of distribution performance by the distributor 70 and/or distribution devices. For example, if an analysis of the past history of distribution performance by the distributor's Main Street Central Office 210 and the distributor's Old Downtown Central Office 224 distribution locations shows that the notification distribution capacity of the distributor 70 is greatly reduced on weekdays between 9:00 AM and 5:00 PM, the calculation module 202 can advantageously reduce the transmission rate at which the notifications 32 are distributed by the transmission interface 206. In certain embodiments, if the notification distribution capacity of the distributor(s) 70 is determined to be impaired, then the calculation module 202 is configured to reduce, delay, or even stop the transmission of notifications 32 until the notification distribution capacity of the distributor(s) 70 is improved. For example, if the notification distribution capacity of a distributor 70 is determined to be at or near 80% of maximum distribution capacity, a value at which a distributor 70 may stop or delay the delivery of network traffic, including the notifications 32, in order to reserve at least 20% network capacity for emergency use, the calculation module 202 can manually or automatically stop the transmission of the notifications 32.

Figure 3:
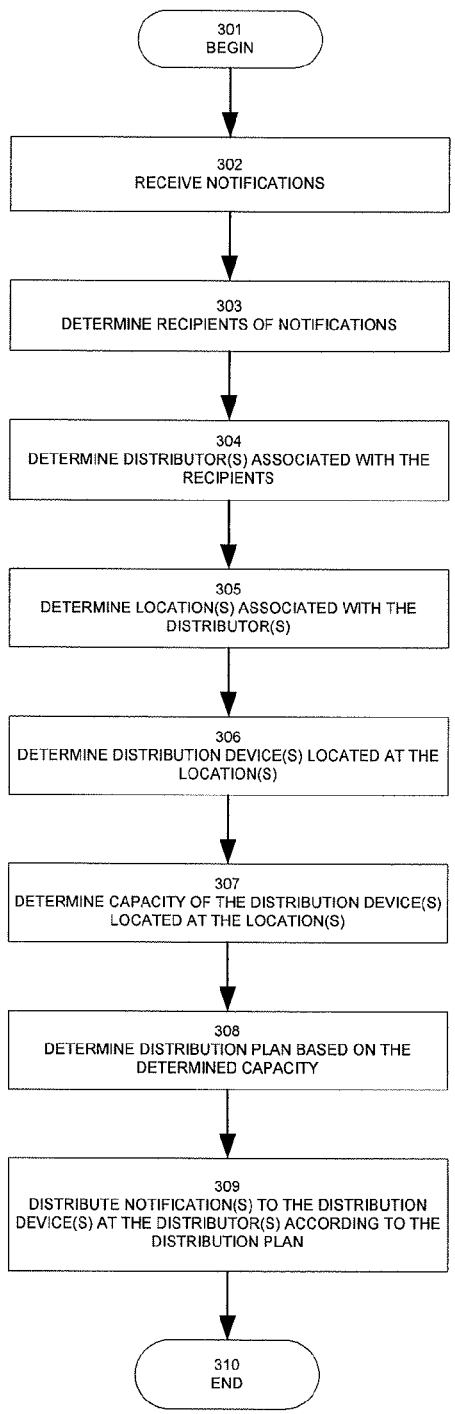
FIG. 3 is a flow chart illustrating an exemplary operation of distributing notifications based on the capacity of a distributor.

FIG. 3 is a flow chart illustrating an exemplary process of distributing notifications (e.g., by mass notification provider computer system 26) based on the capacity of the distributor 70. The process may be repeated for any and all additional distributors configured to transmit a notification to recipients.

The process proceeds from beginning step 301 to step 302 in which notifications intended for distribution are received, such as from the storage 48 of mass notification provider computer system 26 by identification module 204. Next, in step 303, the notifications are analyzed (e.g., by identification module 204) to determine intended recipients of the notifications. In step 304, a distributor 70 responsible for delivering the notifications to the intended recipients is determined (e.g., by identification module 204). Next, in step 305, distribution locations associated with the distributor's delivery of the notifications is determined (e.g., by calculation module 202). The distribution devices located at the distribution locations are optionally determined (e.g., by calculation module 202) in step 306, and a notification distribution capacity is determined (e.g., by calculation module 202) in step 307 based on the capacity of the distribution devices located at the distributor's locations. Although obtaining information on the distribution devices is helpful in determining a distribution plan, it is not necessary, as an efficient distributed delivery can be achieved by distributing notifications to specific distribution locations without specifying any distribution devices at those distribution locations. For example, the calculation module 202 of mass notification provider computer system 26 may determine that a location "Waterfront" for distributor 70 is responsible for delivering notifications 32 to recipients living near a certain waterfront region, while another location "Downtown" for distributor 70 is responsible for delivering notifications to recipients living near a certain downtown region. Without determining the type or transmission rate of distribution devices at locations Waterfront or Downtown, the calculation module 202 can organize notifications 32 according to regions such that only those notifications 32 for intended recipients near the waterfront region are sent to location Waterfront, while notifications 32 for intended recipients near the downtown region are sent to location Downtown. As a result, the need for the distributor 70 to exchange notifications between its two locations based on the intended recipients' location is removed, resulting in an efficient distribution of those notifications 32 by the distributor's 70 two locations.

Next, in step 308, a distribution plan is determined (e.g., by calculation module 202) based on the determined notification distribution capacity. Lastly, in step 309, the notifications are distributed (e.g., by transmission interface 206) to the distribution devices at the distributor 70 according to the distribution plan. The process ends in step 310.

Having set forth in FIG. 3 a process by which notifications 32 are distributed according to distribution capacity, an example will now be presented using the process of FIG. 3, a fictional mass notifications provider "Whiteboard," a fictional distributor 70 "WayneLex" having two distribution locations, Location A including multiple digital switches capable of delivering notifications at a very high rate to the residents of Metropolis, and Location B including two analog switches, each analog switch with capacity to enable the delivery of notifications at a rate of about ten notifications per second to the residents of Smalltown.

Proceeding from beginning step 301 to step 302, Whiteboard receives a request from a user 22 for a group of 10,000 notifications, each less than 10 seconds in duration, including the message "This is Police Chief Smith calling to inform you that, due to severe weather, highway 21 between Metropolis and Smalltown has been shut down.". Next, in step 303, Whiteboard determines, with reference to the recipient set 38 in the notifications 32, that the group of notifications 32 is intended for various distribution to the residents of both Metropolis and Smalltown. In step 304, Whiteboard determines that the distributor 70 WayneLex is responsible for delivering the notifications 32 to the NPA/NXXs affiliated with Metropolis and Smalltown. The delivery is through Locations A and B, respectively, as determined in step 305. Using a mass notification provider computer system 26 as disclosed herein to reference LERG information, Whiteboard further determines in step 306 that the notifications 32 will be delivered to the selected residents with NPA/NXX codes affiliated with Metropolis using three digital switches and the notifications 32 will be delivered to the residents with NPA/NXX codes affiliated with Smalltown using two analog switches. The notification distribution capacity for delivery of the group of notifications 32 by WayneLex is determined in step 307 based on the capacity of each digital and analog switch located at Locations A and B, respectively, less normal network congestion and with a reserve to anticipate that 20% of total capacity is saved for emergency use. Next, in step 308, using the system as disclosed herein, Whiteboard determines a distribution plan in which the group of notifications 32 are divided into subgroups: (1) a subgroup of the 9,500 notifications intended for distribution to the selected group of residents of Metropolis, with each intended phone number aligned with the respective destination switch, bundled with like phone numbers and then divided up and distributed sequentially to the 3 digital switches at Location A immediately, and (2) two sets of notifications intended for distribution to the residents of Smalltown, one set per analog switch at Location B, wherein each set of notifications includes 10 notifications divided into 5 subgroups. Next, in step 309, Whiteboard immediately distributes the 9500 notifications for the residents of Metropolis to the series of digital switches at Location A using the appropriate algorithms, while Whiteboard periodically (for example, one group per minute) distributes, in timed succession, 5 subgroups of 10 notifications for the residents of Smalltown to each of the analog switches at Location B, until all 500 notifications are delivered. The process ends in step 310.

With the above-described system and method, distribution of mass notifications to intended recipients is provided to ensure that notifications are delivered based on the capacity of the distribution network. By distributing notifications according to a distribution network's excess capacity patterns, the likelihood that notifications will be successfully delivered is substantially increased.

Figure 4:
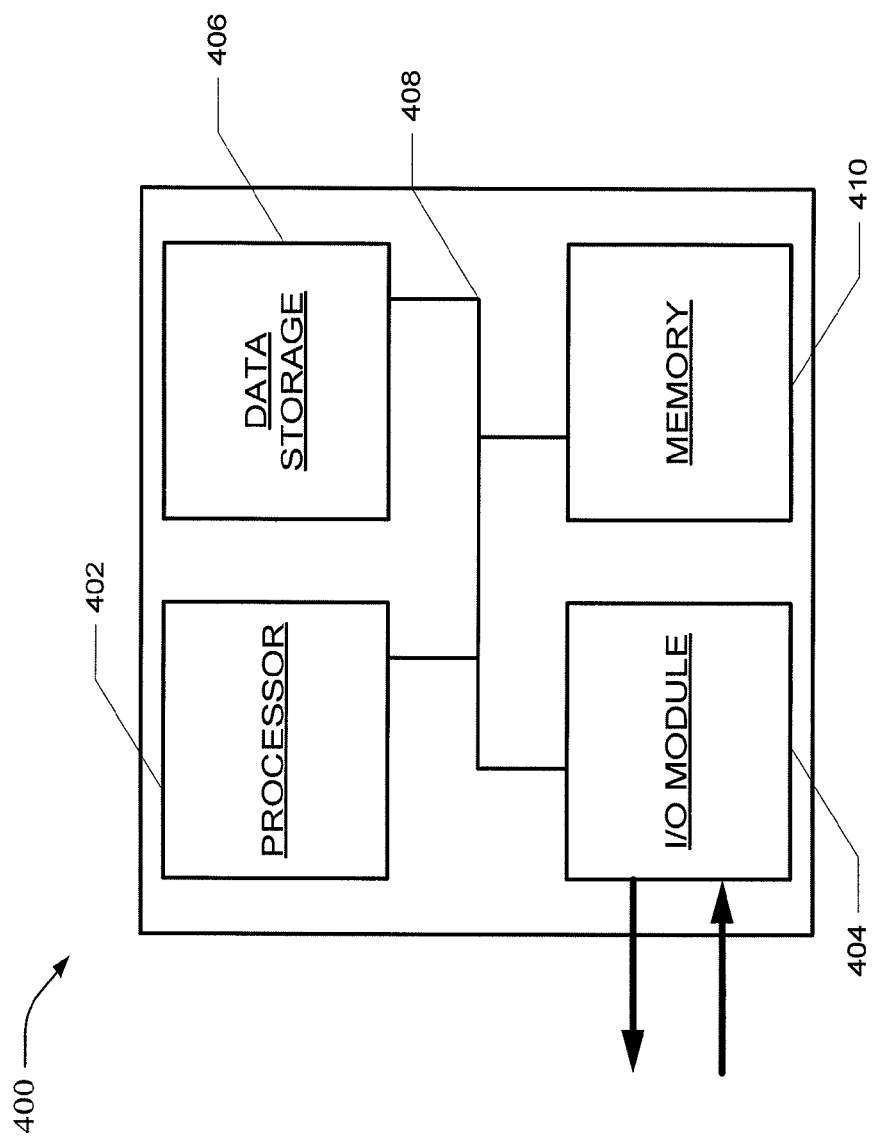
FIG. 4 is a block diagram illustrating an example of a computer system upon which notifications are distributed based on the capacity of a distributor.

FIG. 4 is a block diagram that illustrates a computer system 400 upon which an embodiment of the present disclosure may be implemented in accordance with one aspect of the present disclosure. Computer system 400 includes a bus 408 or other communication mechanism for communicating information, and a processor 402 coupled with bus 408 for processing information. Computer system 400 also includes a memory 410, such as a random access memory ("RAM") or other dynamic storage device, coupled to bus 408 for storing information and instructions to be executed by processor 402. Memory 410 may also be used for storing temporary variable or other intermediate information during execution of instructions to be executed by processor 402. Computer system 400 further includes a data storage device 406, such as a magnetic disk or optical disk, coupled to bus 408 for storing information and instructions.

Computer system 400 may be coupled via I/O module 404 to a display device, such as a cathode ray tube ("CRT") or liquid crystal display ("LCD") for displaying information to a computer user. An input device, such as, for example, a keyboard or a mouse may also be coupled to computer system 400 via I/O module 404 for communicating information and command selections to processor 402.

According to one aspect of the present disclosure, the transmission of notifications 32 may be implemented using a computer system 400 in response to processor 402 executing one or more sequences of one or more instructions contained in memory 410. Such instructions may be read into memory 410 from another machine-readable medium, such as data storage device 406. Execution of the sequences of instructions contained in main memory 410 causes processor 402 to perform the process steps described herein. One or more processors in a multi-processing arrangement may also be employed to execute the sequences of instructions contained in memory 410. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 406. Transmission media include coaxial cables, copper wire, and fiber optics, including the wires that comprise bus 408. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for distributing notifications to a plurality of recipients, comprising:
    an identification module configured to identify a first distributor configured to transmit at least one notification of a certain type to a plurality of recipients from among a plurality of distributors capable of transmitting the certain type of the at least one notification;
    a calculation module configured to determine, using a processor, a notification distribution capacity of the first distributor; and
    a transmission module configured to transmit the at least one notification to the first distributor based on the notification distribution capacity of the first distributor;
    wherein the transmission module is further configured to transmit rate information to the first distributor, the rate information based on the notification distribution capacity of the first distributor, and the rate information configured to indicate a rate at which the at least one notification should be distributed by the first distributor to the plurality of recipients;
    wherein the rate information is configured to indicate a reduced rate at which the at least one notification should be distributed by the first distributor to the plurality of recipients when the notification distribution capacity of the first distributor is reduced.

2. The system of claim 1,
    wherein the plurality of recipients comprises a first group of recipients and a second group of recipients,
    wherein the identification module is further configured to identify a second distributor configured to transmit the at least one notification to the plurality of recipients,
    wherein the calculation module is further configured to determine a notification distribution capacity of the second distributor, and
    wherein the transmission module is configured to transmit, based on the notification distribution capacity of the first distributor and the notification distribution capacity of the second distributor, the at least one notification for the first group of recipients to the first distributor, and the at least one notification for the second group of recipients to the second distributor.

3. The system of claim 1, wherein the notification distribution capacity is based on at least one of: routing data associated with the first distributor, the time at which the at least one notification is intended to be transmitted, the size of the notification, a priority associated with the notification, and a history of distribution performance.

4. The system of claim 1, wherein the first distributor includes at least one distribution device, and wherein the at least one notification is transmitted to the at least one distribution device using a code associated with the distribution device.

5. The system of claim 4, wherein the code is a numbering plan code.

6. The system of claim 1, wherein the notification distribution capacity of the first distributor is reduced when the notification distribution capacity of the first distributor is at least 80% of the maximum distribution capacity of the first distributor.

7. The system of claim 1, wherein the certain type of the at least one notification is a voice notification.

8. A method for distributing notifications to a plurality of recipients, comprising:
- receiving at least one notification of a certain type for distribution to the plurality of recipients;
- identifying a distributor configured to transmit the at least one notification to at least one of the plurality of recipients from among a plurality of distributors capable of transmitting the certain type of the at least one notification;
- determining a notification distribution capacity of the distributor;
- transmitting the at least one notification to the distributor based on the notification distribution capacity of the distributor; and
- transmitting rate information to the distributor, the rate information based on the notification distribution capacity of the distributor, and the rate information configured to indicate a rate at which the at least one notification should be distributed by the distributor to the plurality of recipients;
- wherein the rate information is configured to indicate a reduced rate at which the at least one notification should be distributed by the distributor to the plurality of recipients when the notification distribution capacity of the distributor is reduced.

9. The method of claim 8, wherein the notification distribution capacity is determined based on at least one of: routing data associated with the distributor, the time at which the at least one notification is intended to be transmitted, the size of the notification, a priority associated with the notification, and a history of distribution performance.

10. The method of claim 8, wherein the distributor includes at least one distribution device, and wherein the at least one notification is transmitted to the at least one distribution device using a code associated with the distribution device.

11. The method of claim 10, wherein the code is a numbering plan code.

12. The method of claim 8, wherein the certain type of the at least one notification is a voice notification.

13. A non-transitory machine-readable medium encoded with instructions for distributing notifications to a plurality of recipients, the instructions comprising code for:
- receiving at least one notification of a certain type for distribution to the plurality of recipients;
- identifying a distributor configured to transmit the at least one notification to at least one of the plurality of recipients from among a plurality of distributors capable of transmitting the certain type of the at least one notification;
- determining a notification distribution capacity of the distributor;
- transmitting the at least one notification to the distributor based on the notification distribution capacity of the distributor; and
- transmitting rate information to the distributor, the rate information based on the notification distribution capacity of the distributor, and the rate information configured to indicate a rate at which the at least one notification should be distributed by the distributor to the plurality of recipients;
- wherein the rate information is configured to indicate a reduced rate at which the at least one notification should be distributed by the distributor to the plurality of recipients when the notification distribution capacity of the distributor is reduced.

* * * * *